Jan. 24, 1950        A. N. MILSTER        2,495,340
STOPMETER
Filed March 14, 1945        3 Sheets-Sheet 1
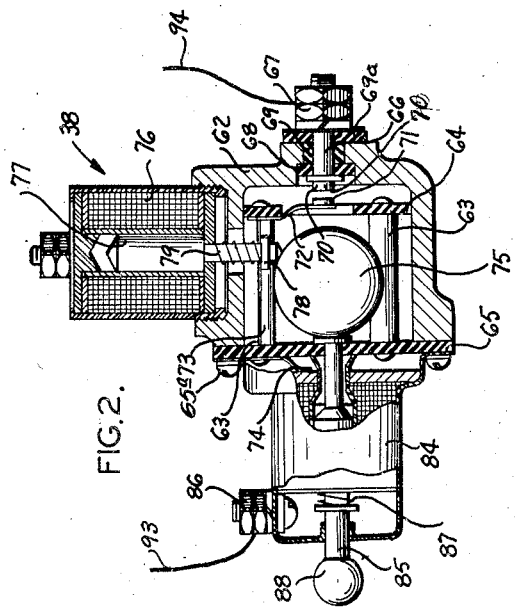
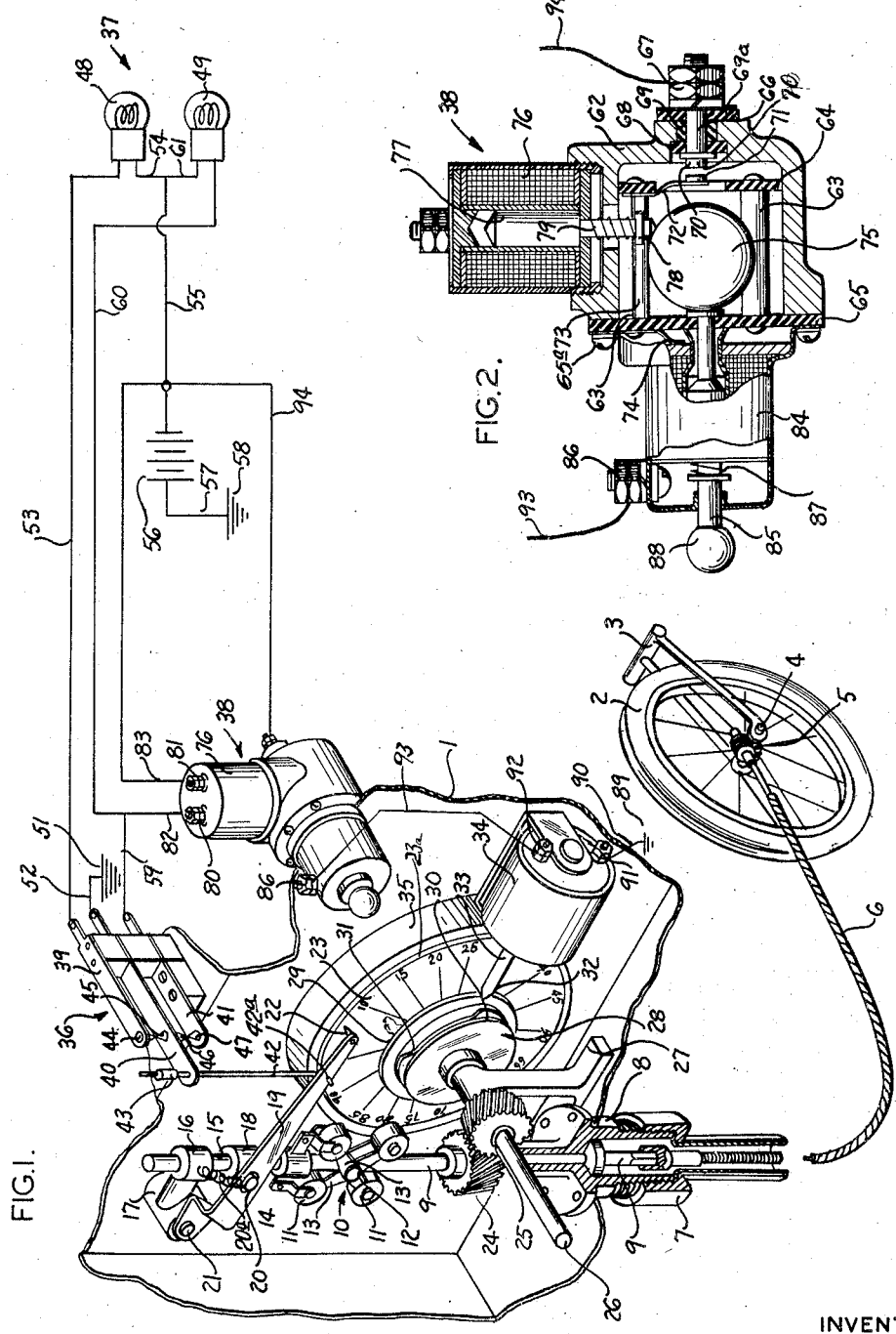
INVENTOR:
ARTHUR N MILSTER
BY *Lee Huffman*
ATTORNEY Jan. 24, 1950     A. N. MILSTER     2,495,340
STOPMETER
Filed March 14, 1945     3 Sheets-Sheet 2
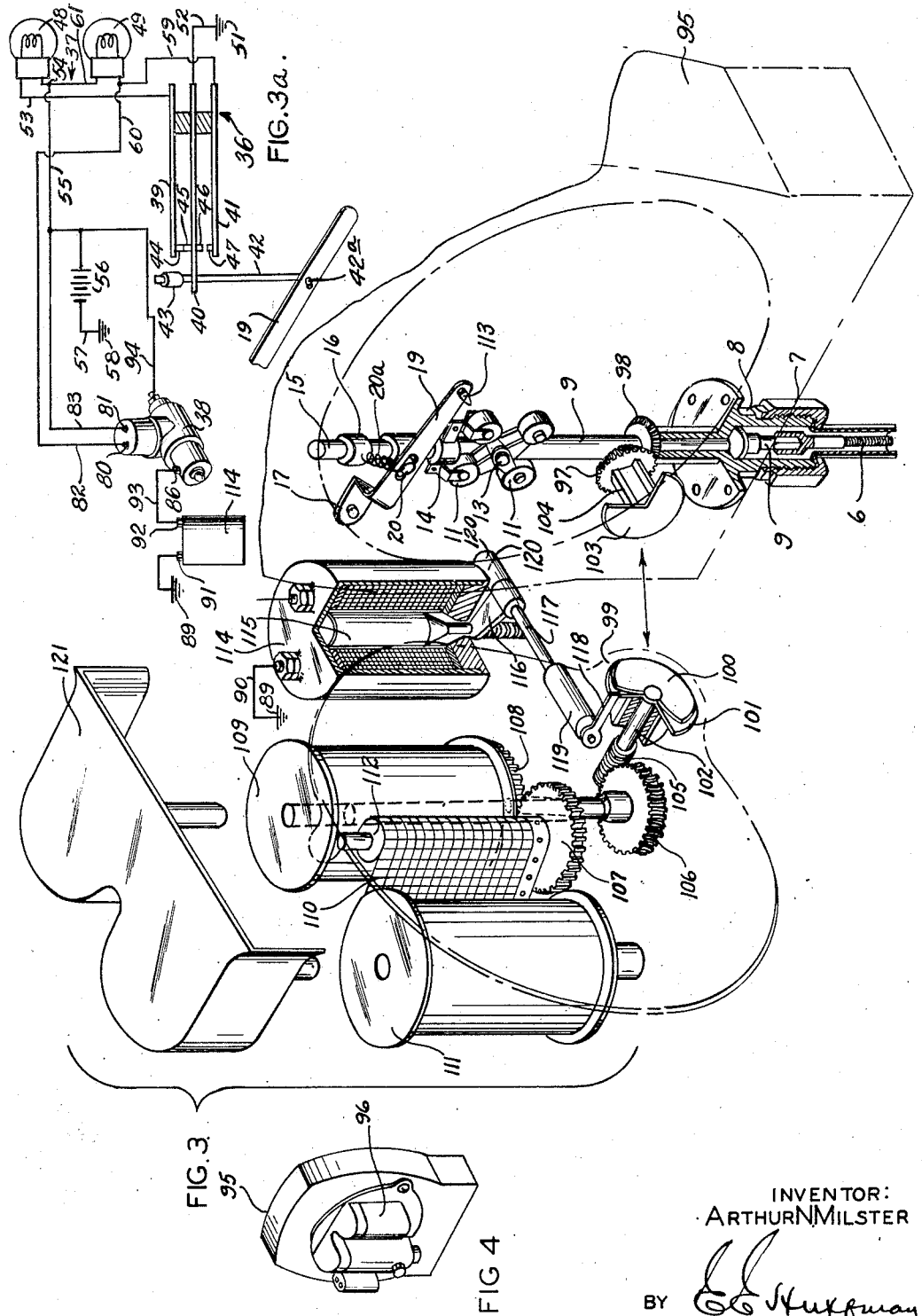
INVENTOR:
ARTHUR N MILSTER
BY *(signature)*
ATTORNEY Jan. 24, 1950     A. N. MILSTER     2,495,340
STOPMETER
Filed March 14, 1945     3 Sheets—Sheet 3
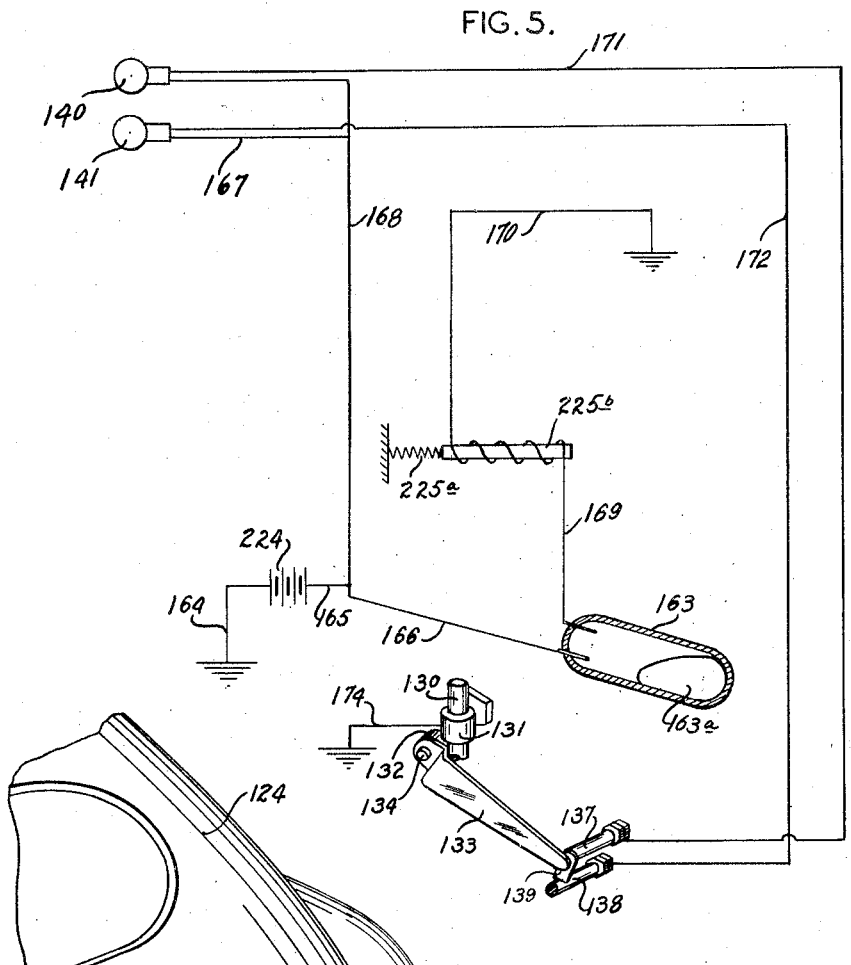
FIG. 5.
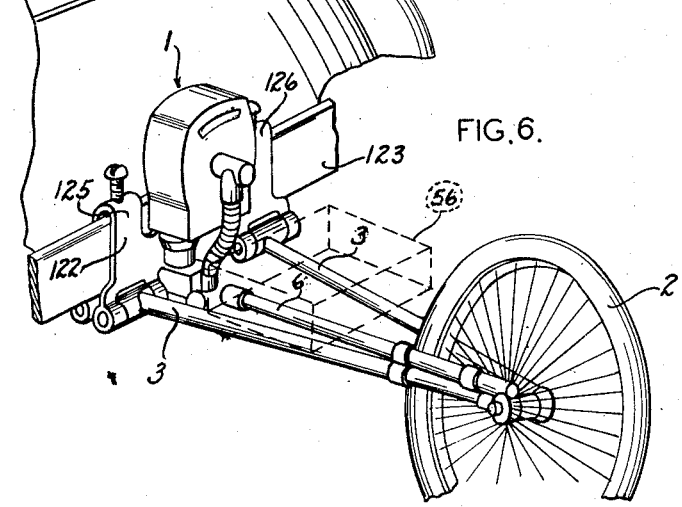
FIG. 6.
INVENTOR:
ARTHUR. N. MILSTER
BY 
ATTORNEY Patented Jan. 24, 1950

2,495,340

UNITED STATES PATENT OFFICE 2,495,340

STOP METER

Arthur N. Milster, Ferguson, Mo., assignor to Wagner Electric Corporation, St. Louis, Mo., a corporation of Delaware Application March 14, 1945, Serial No. 582,712

13 Claims. (Cl. 73—128)

This invention relates to devices for measuring braking characteristics of vehicles or other moving bodies in terms of lineal distances and in its more specific aspects is directed to a device capable of making permanent records of the lineal distances.

One of the objects of this invention is to provide a stopmeter adapted to make a permanent record of the braking characteristics of a self-propelled vehicle.

Another object of this invention is to provide a stopmeter which is capable of producing a permanent record of each test stop in graphical form showing the stopping distances, the instantaneous values of speeds, and changes therein during the entire stopping or deceleration period.

A still further object of the invention is to provide a stopmeter capable of producing a permanent record with means to prevent the operation of the stopmeter until the towing vehicle or moving body has attained a preselected speed.

Another and still further object of the invention is to provide a stopmeter capable of producing a permanent record producing type stopmeter having incorporated therein means enabling the operator to select the test period and other means to automatically prevent a record test until the vehicle has attained a preselected speed.

In the drawings:

Figure 1 is a view, partly in section, showing the essential elements of the stopmeter;

Figure 2 is a sectional view of the inertia switch employed in Figure 1;

Figure 3 shows a view, partly in section, of a modified form of the invention;

Figure 3a is a circuit diagram of the device shown in Figure 3;

Figure 4 shows a perspective view of the assembled device of Figure 3;

Figure 5 shows a wiring diagram of another modification of the structure in Figure 1; and Figure 6 shows the general assembly view of the mode of attachment of the stopmeter to a moving vehicle.

Figure 1 sets forth a preferred embodiment of the invention in which numeral 1 designates a portion of a housing supporting the measuring and operating devices necessary to record the data during the stopping test. This device originates in a wheel 2 suitably arranged in a frame 3 provided with an axle 4 on which the wheel 2 is rotatably mounted. The part of gear set 5 which is fixed to axle 4, meshes with another part of the gear set fixed to a flexible shaft 6 and transmits rotative movement from the wheel to the operating mechanism. Shaft 6 terminates in coupling 7 threadably secured to an appropriate fixture 8 fixed in housing 1.

Shaft 9 is rotatably mounted in housing 1 and is operatively connected to shaft 6 by means of coupling 7. Bushing 8 forms the bearing for shaft 9 which operates a speed responsive mechanism 10 comprising a plurality of weights 11 whose distance from the centerline of shaft 9 varies proportionally to their speed of rotation; the principle of operation being similar to the well known flyball governor. The several weights 11—11 are secured to arms 13—13 which are pivotally attached to shaft 9 by pin 12. The upper end of each of the cross arms 13—13 is operatively associated with head device 14 rigidly secured to shaft 15 which is slidably journalled in bearing 16 attached to housing 1 by boss 17. Pin 20 engages an annular groove in shaft 15 which rotatably secures collar 18 to said shaft. Spring 20a attached to pin 20 and bearing 16 urges shaft 15 and collar 18 to the zero speed position as shown in Figure 1. Lever 19 carrying stylus 22 is pivoted at 21 to boss 17. Pin 20 operatively connects lever 19 with collar 18 and thus imparts the vertical motion of shaft 15 to lever 19. The stylus 22 is positioned to suitably scribe chart 23 mounted on chart holder 23a.

Shaft 9 has a helical gear 24 fixed thereon which meshes with a second helical gear 25 fixed to a shaft 26 journaled in a bearing 27. Shaft 26 has a clutch device 28 operatively associated therewith comprising a pair of discs 29 and 30 between which a spring 31 is arranged. The disc 29 has a notch 32 formed therein, in which a plunger 33, operated by a solenoid 34 is receivable. The record sheet 23 is suitably secured to a record sheet holder 23a mounted in housing 35 which is part of casing 1. Clutch 28 has suitable friction elements therein which enable discs 29 and 30 to slip during the inoperative condition of the stopmeter, but when plunger 33 is withdrawn from notch 32 the chart or record sheet 23 and holder 23a supporting the same will be rotated by means of wheel 2 through the several motion transmission elements described. The rotative movement of record sheet 23 and consequently the projected length of the line traced by scriber 22 is directly proportional to the distance travelled during the stopping period of the vehicle or body, while the vertical movement of the scriber 22, being proportional to the rate of speed of the vehicle, indicates the instantaneous values of speed. The scribed line on appropriately preprinted chart 23 thus records both the speed changes and the distance travelled during the selected test period.

Means has been provided in the instant disclosure to inform the operator when the vehicle has attained a preselected speed from which the test is to be started and further has provided means to prevent the rotation of chart holder 23a until such preselected speed has been achieved. To this end the speed responsive device terminating in lever 19 has operatively associated therewith a switch generally designated by 36 controlling a set of signals 37 and a solenoid and inertia operated switch 38.

Switch 36 is a selector switch which includes three elements 39, 40, and 41. The position of switch element 40 is controlled by the speed responsive lever 19. A member 42 extends between lever 19 and switch element 40, said member being pivoted to lever 19 at 42a and slidably received through an aperture in switch element 40. Stop 43 adjustably received on 42 determines when 40 will be moved relative to the parts 39 and 41. Therefore, when lever 19 moves vertically in response to the variations in speed of wheel 2, switch element 40 will be moved from its normal position shown in Figure 1 in which contacts 44 and 45 secured to switch elements 39 and 40, respectively, are closed to the position in which contacts 46 and 47 are brought into engagement. The element 40, being resilient in character, will be restored to the position in which contacts 44 and 45 are in engagement with each other at the completion of a stopping test at which time lever 19 will be urged to its uppermost or zero position by spring 20a.

Switch 36 and its component parts are connected to the elements of signal 37 which comprises a pair of lamps 48 and 49 each of which may be of different color, green being the color selected for lamp 48 and red for lamp 49. Other modes or forms of signals may be employed such as different toned buzzers or any other combination of visible or audible signals. The switch 36 also controls certain elements in the switch 38 and the several circuits connecting the same are subsequently set forth. For green light 48, indicating insufficient speed, the circuit originates in a ground connection 51 and is connected to the switch element 40 by means of a conductor 52 thence through contacts 44 and 45, switch element 39, conductor 53, lamp 48, conductors 54 and 55, a source of supply or battery 56, conductor 57 to ground connection 58. As previously set forth, when the speed of the vehicle has reached a preselected value based upon the position of stop element 43 on rod or connector 42, the switch element 40 will be shifted to close contacts 46 and 47. This will establish another circuit which originates in the ground connection 51 by means of conductor 52 through switch element 40, contacts 46 and 47, switch element 41, conductor 59, conduit 60, conductor 61, and thence by way of conductor 55 through battery 56 and conductor 57 to ground 58, thereby closing the circuit to red lamp 49, thus indicating to the operator that the vehicle under test has reached its preselected speed.

The energizing circuit for the solenoid 34 is responsive to switch 38 which is under the control of switch 36 and is necessarily responsive to the speed of the vehicle under test. The inertia switch 38 comprises a housing 62 in which a frame is arranged comprising a plurality of rods 63, one end of each being fixed to an insulating plate 64 and at their opposite ends are secured to a second insulating plate 65 also serving as a closure for housing 62. Secured in one end of housing 62 is a fixed conductor 66 in the form of a bolt held in place by means of a plurality of nuts 67 threaded to one end thereof intended to receive a conductor therebetween as well as to lock the conductor 66 in the housing. Conductor 66 is surrounded by appropriate insulating elements 68, 69, and 69a. The inner end of conductor 66 is headed to form a contact 70 which is engageable by a contact 71 secured to a flexible element 72. The flexible element 72 is secured at its one end to the non-conducting ring 64 and a conductor 73 is electrically connected to element 72, and 73 is connected to conductor 74. Arranged within the frame is a ball 75, the position of which is responsive to the deceleration of the vehicle under test. In order to prevent the ball from rolling to the right, as viewed in Figure 2, it is held in the left hand position by means of the plunger 77 of solenoid 76 whose head 78 formed thereon is engageable with the ball 75. The plunger 77 is retained in its downward position by means of a spring 79 and when the solenoid 76 is energized, plunger 77 is urged away from the ball, thereby freeing ball 75 and enabling it to move to the right during the period the vehicle under test is being decelerated, thereby placing the contacts 70 and 71 in engagement.

The solenoid 76 has a pair of binding posts 80 and 81 thereon which have conductors 82 and 83 connected thereto included in the switch circuit previously set forth. During the inoperative condition of the stopmeter the circuit to the solenoid 76 is open but when the appropriate speed has been reached, then solenoid 76 becomes energized and will lift plunger 77 to free the ball 75. This circuit originates in the ground connection 51 and thence by conductor 52 to switch element 40, contacts 46 and 47, conductors 59 and 82, solenoid 76, conductor 83, thence by way of a portion of conductor 55, battery 56 and conductor 57 to ground 58, thereby completing the circuit.

The closure 65 has secured thereto a solenoid 84 having a plunger 85 therein. The solenoid is secured to housing 62 by means of a plurality of screws 65a and the conductor 74 connected in series with contacts 70 and 71 carries the source of power to the solenoid 84. The conductor 74 is permanently connected to one end of coil 84 and the other end terminates in rod 73. A spring 87 is intended to urge the plunger 85 to the position indicated in Figure 2. The circuit for energizing solenoid 84 is independent of switch 36 and originates in a ground connection 89 thence by means of conductor 90 to one of the binding posts 91, solenoid 34, binding post 92, conductor 93, binding post 86, coil 84, conductor 74, conductor 73, contact supporting element 72, contacts 71 and 70 thence through conductor 66, conductor 94, conductor 55, battery 56, and conductor 57 to ground 58. The energization of solenoid coil 84 will cause plunger 85 to move to the right into engagement with ball 75 to keep the circuit closed after the ball has closed the contacts 70 and 71 because of deceleration of the vehicle. As indicated, this plunger will maintain the circuit closed during the entire period of test so as to prevent the possibility of a false or unintentional opening of the circuit for the solenoid 34 during the period of test. The plunger 85 of solenoid 84 may be manually moved to the left and thus restored to the position shown in Figure 2 thereby opening the circuit and placing the stopmeter in condition for another test run.

Ball 75 normally tends to move to the left by reason of tilt of the rod elements 63. The switch element 40 moves to the upward position after speed responsive arm 19 is restored to its zero position.

The modification shown in Figures 3 and 4 sets forth a structure that is basically the same as in Figure 1 with the exception that the record sheet is a continuous strip of paper rather than a circular disc. The same parts bear the same reference numerals as in Figure 1. The basic structure, such as control circuits, signals, et cetera, of Figure 1 is employed in Figure 3 whose operation with respect to the record sheet is likewise the same.

The housing 95 is generally shown in Figures 3 and 4 and has a cover device 96 hinged thereto in which the record sheet and mechanism therefor is arranged. The record sheet is driven from the principal shaft 9 in the same manner as the circular disc of Figure 1, the power being taken from shaft 9 by means of a pair of bevel gears 97 and 98. Gear 97 operates one portion of a clutch assembly 99 with spring element 100 inserted therebetween which corresponds to spring element 31. A disc 101 is fixed to a shaft 102 rotatably mounted in cover 96 and a disc 103 associated with a shaft 104 driven by gear 97 engages with the resilient element 100 to transmit rotative motion to shaft 102. The clutch parts are shown separated for purposes of clarity. Associated with shaft 102 is a worm 105. Worm 105 drives a worm gear 106, to which the shaft of gear 108 and spool 109 are rigidly fixed. Spool 109 is appropriately rotatably supported in cover element 96. Gear 108 meshes with and drives gear 107 to which roller 112 is secured. A supply of suitably preprinted graphic record sheet 110 is arranged on a second spool 111 likewise appropriately rotatably mounted in cover 96. The graphic record sheet passes around a secondary roller 112 arranged on an axis coaxial with gear 107. The graphic sheet is perforated at its edges in order that it may engage with the proper spike formations on the roller 112 to properly withdraw the graphic sheet from spool 111 and wind it taut onto the spool 109.

An appropriate scriber 113 arranged on arm 19 properly records the speed and stopping distance measured by the instrument. In order that movement will be initiated in the record sheet, means similar to electromagnet 34 are provided in the form of a solenoid or electromagnet 114 likewise appropriately arranged in cover 96. The plunger 115 thereof is connected by means of arm 116 to a rock shaft 117 having an arm 118 thereon engageable in an appropriate slot in disc 101. Upon energization of solenoid 114, shaft 117 is rotated in its bearings 119 and 120 to withdraw arm 118 from the slot or indentation in 101 to thereby initiate movement in the record strip, it being understood that rotative motion in clutch plate 103 will then rotate clutch plate 101 as long as arm 118 is withdrawn from the slot. An auxiliary cover element 121 cooperates with the cover 96 which is hinged or otherwise arranged on housing 95 to enclose spool elements 109 and 111 and solenoid 114 and associated parts. The cooperation of solenoid 114 with respect to the other parts of the circuit shown in Figure 1 is the same, it being understood that the circuit which includes the selector switch 36, signals 37, inertia switch 38 and its component parts is the same as employed in the Figure 2 disclosure. Except for the type of record sheet used the operation is identical.

Figure 6 shows a mode of instrument mounting in which wheel 2, housing 1, source of supply such as battery 56, are employed. The frame 3 is shown in a slightly different form, being pivoted to a bracket 122 secured to a bumper 123 associated with vehicle 124. The frame elements 3 are pivoted to the brackets in a conventional manner and by means of ear elements 125 and 126 constituting part of frame 122 are locked to the bumper. By this means the entire fixture is attached to the bumper of the vehicle. Attention is invited to the fact that bumper 123 may be the rear or the forward bumper depending upon whether it is desired to push or pull the trailer unit. The unit may operate with equal facility if secured to the vehicle running-board or any other portion thereof. The term "trailer" as used herein is intended to cover devices pushed, pulled, or drawn along side of the vehicle, such as being secured to the running-board.

Another modification of the above device is schematically illustrated in Figure 5 in which a mercury switch 163 is employed in lieu of the inertia switch 38 in which the mercury 163a closes the contacts extending into the mercury tube. The swinging arm element 133 is the same as arm 19 of the Figure 1 disclosure and its associated parts 130, 131, 132, and 133 correspond to similar parts in Figure 1. Associated with arm 133 is a contact element 139 which selectively engages fixed contacts 137 and 138 corresponding to switch 36. The signal comprises lamps 140 and 141 corresponding to red and green lights 48 and 49, as indicated above. Parts 225a and 225b show the detailed construction of plunger 33 of electromagnet 34 which parts are also present in the disclosure of Figure 1. The spring 225 is not shown in Figure 1 to withdraw plunger 32. The conductors 164, battery 224, conductors 165, 166, 167, 168, 169, 170 and 172 selectively energize the solenoid plunger 225b and illuminate red lamp 141 when contact 139 engages fixed contact 138. The normal condition of operation is such that green lamp 140 is illuminated, indicating insufficient speed of the vehicle. Lamp 140, normally illuminated, is extinguished after the vehicle has reached a preselected speed, whereupon contact 139 will engage contact 138 and disengage contact 137 to illuminate red lamp 141 and energize the solenoid so that its plunger 225b will be removed from a clutch element similar to 28 and 99. The same type of record elements as illustrated in Figures 1 and 3 may be employed with the circuit illustrated in Figure 5. It is understood that mercury switch 163 will be closed only during deceleration of the vehicle being tested and cessation of the deceleration will immediately open the circuit and interrupt the recording of the test data.

The operation of the aforesaid device for all disclosures is such that when a record sheet is arranged on holder 23a or in the spools, as shown in Figure 3, motion will be initiated in the record holder upon the start of deceleration of the vehicle being tested, motion continuing therein until the vehicle comes to rest in all of the forms except that disclosed by Figure 5. Upon completion of the test, the record sheet may be removed by disengaging a suitable retaining means.

Having fully described my invention, that which I claim as novel and desire to protect by Letters Patent of the United States is:

1. A stopmeter mechanism for a vehicle comprising a trailer; a chart support mounted for rotation on said trailer; a chart supported thereon; means to rotate said chart support; a clutch to govern the rotation of said means; a solenoid to control the operation of said clutch; an inertia switch; a speed responsive device operable by said means to rotate said chart; means operatively associated with said speed responsive device engageable with the chart to scribe same; means operable by said speed responsive device to release said inertia switch; signal means responsive to said speed responsive device to indicate when the towing vehicle has attained the proper speed, said inertia switch being adapted to close when the towing vehicle decelerates; and means to keep said inertia switch closed.

2. A stopmeter for a vehicle comprising a trailer; a chart support on said trailer; a chart in said support; means to actuate said chart support; a clutch to connect said means with said chart support; a solenoid to control said clutch; a speed responsive device driven from said means; means operatively associated with said speed responsive device engageable with said chart to mark same; a signal to inform the operator of the speed condition of the vehicles; a circuit for said signal; a switch operated by said speed responsive device in said circuit to control said signal; an inertia switch; a circuit for said solenoid including said inertia switch; and means associated with said inertia switch controlled by said speed responsive device to permit operation of said inertia switch upon deceleration of the vehicle to enable movement to be initiated in said chart to thereby record the speed variation and stopping distance of the vehicle.

3. In a stopmeter device for a vehicle, a trailer; a chart support on said trailer; means to actuate said chart support; a clutch to control the application of said means; a solenoid to control the operation of said clutch; an inertia switch to control said solenoid; speed indicating signal mechanism on the vehicle; a speed responsive switch operable by said means to control said inertia switch and said speed indicating signal mechanism, the deceleration of the vehicle closing said inertia switch and actuating said solenoid; and scriber means responsive to the deceleration of the vehicle to scribe a chart located on said chart support.

4. In a stopmeter, a trailer; a first means on said trailer to record the results of a test; a second means to scribe the results of a test on said first means; a speed responsive device to control said second means; a third means to operate said first means and said speed responsive device; a clutch in said third means; a fourth means to control said clutch; an inertia responsive means to control said fourth means; and a fifth means controlled by said speed responsive means to place said inertia means in condition for operation upon deceleration of said trailer.

5. In a stopmeter, a vehicle to be moved by a moving body; a record holder on said vehicle; a record sheet in said holder; means to operate said record holder; a scriber to scribe the record sheet; clutch means to control the application of said first mentioned means; a speed responsive device operated by said first mentioned means, said device actuating said scriber; a switch operated by said device; an inertia switch; an electrical circuit including said switch and said inertia switch; means controlled by said speed responsive device to place said inertia switch in operable condition and said third mentioned means operable when the vehicle is decelerated.

6. In a stopmeter, a trailer securable to a towing vehicle; a record holder on said trailer; a record sheet thereon; means to operate said record holder; a clutch to control the application of said means; a solenoid to control the actuation of said clutch; a speed responsive device operated by said means; means operable by said speed responsive device to scribe said record sheet on said record holder; a switch operated by said speed responsive device; an inertia switch to control said solenoid; an electrical circuit including said switch and said inertia switch and means incorporated in said inertia switch controlled by said switch to place said inertia switch in operable condition, said inertia switch adapted to close when the towing vehicle is decelerating.

7. In a stopmeter, a trailer securable to a towing vehicle; means on said trailer to support a record sheet; a record sheet on said means; means to operate said means; a speed responsive means operated by said last mentioned means; means associated with said speed responsive means to scribe said record sheet; an inertia switch responsive to the movements of said towing vehicle; means on said inertia switch controlled by said speed responsive means to place said inertia switch in operable condition; and means controlled by said inertia switch to enable said operating means to become effective to operate said record support means after closure to said inertia switch.

8. In a stopmeter device for a towing vehicle, a trailer including a wheel to support same; a chart support on said trailer; means to actuate said chart support by said wheel; a clutch to control the application of said means; a solenoid to control said clutch; a speed responsive device operable by said means; a speed indicating signal means; a scriber operable by said speed responsive device engageable with a chart on said chart support to scribe same; a switch operable by said speed responsive device to control said speed indicating signal means; and an inertia switch made operable by said switch, said inertia switch closing upon braking of said towing vehicle to thereby energize said solenoid and allow said means to actuate said chart support.

9. In a stopmeter device, a trailer; a wheel supporting said trailer; a chart support on said trailer; a chart thereon; means to operate said chart support by said wheel; a clutch to control the application of said means; a solenoid to control said clutch; a speed responsive means operable by said means; a scriber associated with said speed responsive means; an inertia switch operable by deceleration of the trailer to control said solenoid; a second solenoid to place said inertia switch in operable condition; signal devices; a switch controlled by said speed responsive means to control said signal devices and said second solenoid; and an electrical circuit including said signal devices, said solenoids and said switches.

10. In a stopmeter for a vehicle, a trailer securable to said vehicle; a strip type recorder means on said trailer; drive means to operate said record strip from a wheel of the trailer; a clutch to control the application of said drive means; a speed responsive device operable by said drive means; a switch controlled by said speed responsive device; means to mark said record strip and associated with said speed responsive device; an inertia switch controlled by said switch member; means to control said clutch and controlled by said inertia switch; and a circuit for said last mentioned means which includes said inertia switch.

11. In a stopmeter for a vehicle, a trailer securable to said vehicle; a chart holder supported on said trailer; a chart thereon; means to operate said chart holder from a wheel of the trailer; a clutch to control the application of said means; a speed responsive device operable by said means; means to scribe said chart associated with said speed responsive device to obtain a permanent record of speed versus distance traveled by said trailer; means to control said clutch; an electrical circuit which includes an inertia switch controlled by said speed responsive device and said last mentioned means; and signal means controlled by said speed responsive device to indicate vehicle speed.

12. In a stopmeter, a trailer; a first means on said trailer to record the data of a test to produce a permanent record of speed versus distance traveled by said trailer; a second means to scribe the data of a test on said first means; a speed responsive device to actuate said second means; a third means to operate said first means and said speed responsive device; a clutch to control the operation of said third means; a fourth means to operate said clutch; and means to control said fourth means.

13. In a stopmeter, a trailer; a first means on said trailer to record the data of a test; a second means to scribe the data of a test on said first means; a speed responsive device to actuate said second means; a third means to operate said first means and said speed responsive device; a clutch to control the operation of said third means; a fourth means to operate said clutch; means to control said fourth means; and means to permanently record the speed of the towing vehicle on said first means.

ARTHUR N. MILSTER.

REFERENCES CITED

The following references are of record in the file of this patent:

UNITED STATES PATENTS

| Number | Name | Date |
| --- | --- | --- |
| 2,279,409 | Milster | Apr. 14, 1942 |
| 2,305,789 | Kempf | Dec. 22, 1942 |
| 2,370,141 | Brunner | Feb. 27, 1945 |